(12) United States Patent
Bicknell-Tassius et al.

(10) Patent No.: US 6,961,299 B2
(45) Date of Patent: Nov. 1, 2005

(54) STORAGE DEVICE

(75) Inventors: Robert Bicknell-Tassius, Springfield, OR (US); Gary R. Ashton, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 365 days.

(21) Appl. No.: 10/310,606

(22) Filed: Dec. 5, 2002

(65) Prior Publication Data

US 2004/0109402 A1    Jun. 10, 2004

(51) Int. Cl.[7] .............................................. G11B 7/00

(52) U.S. Cl. ................................................ 369/126

(58) Field of Search ........................ 369/126, 101, 369/275.3

(56) References Cited

U.S. PATENT DOCUMENTS

| | | |
|---|---|---|
| 5,557,596 A | 9/1996 | Gibson et al. |
| 6,121,552 A | 9/2000 | Brosnihan et al. |
| 6,574,257 B1 * | 6/2003 | Thronton et al. ............. 372/46 |
| 6,700,853 B2 * | 3/2004 | Raese ......................... 369/101 |

* cited by examiner

*Primary Examiner*—Nabil Hindi (57) ABSTRACT

A storage device has a stator layer, an emitter layer, and a rotor layer. The rotor layer has a plurality of data clusters, each having a substrate which is electrically isolated from the other data clusters by a dielectric material. Another storage device has a means for electrically isolating a plurality of data clusters, each having phase change media coupled to a conductive substrate, from each other. The storage device also has a means for reading a differential signal from each of the data clusters based on currents which flow from the phase change media to the conductive substrate in each data cluster. A method of electrically isolating conductive regions on a micromover device is also provided.

15 Claims, 10 Drawing Sheets

STORAGE DEVICE

INTRODUCTION

It has become difficult to increase the storage density of storage devices such as magnetic hard drives, optical drives, and dynamic randomly accessible memory (DRAM). Many scientists have proposed alternative approaches to increase the storage density. U.S. Pat. No. 5,557,596 (Gibson et al.) discloses an ultra-high-density storage device. This ultra-high density storage device includes at least one field emitter in close proximity to a storage medium, and a micromover for moving the storage medium relative to the field emitter. Each field emitter can generate an electron beam current. The storage medium may have more than one storage area on it, and a field emitter may be assigned to each storage area, or to multiple storage areas. In storing information to the storage device, the power density of an electron beam current generated by the field emitter is adjusted to change the state of the storage area bombarded by the electron beam current. Above certain current thresholds, different physical state changes can be made in the storage area being bombarded by the electron beam current. If two physical states are used, then each location in a storage area would have a binary data potential. Since more than two physical states are possible in a given location, more than binary data levels are possible in each location. In reading information from the device, the power density of the electron beam current may be reduced to generate a signal current from the storage area bombarded by the electron beam current. During reading, the power density is selected to be low enough so that no writing occurs. The magnitude of the signal current depends on the physical state of the storage area. The information stored in the storage area is read by measuring the magnitudes of the signal current. The micromover is able to position the storage medium with respect to the field emitters so that each field emitter can access many storage locations within one or more storage areas.

Each of the storage areas, or data clusters, may have an area of phase change material which is coupled to a highly conductive silicon substrate. While the data clusters of phase change material are isolated from each other, their common silicon substrate does not allow for differential signal processing of the individual media patches.

DETAILED DESCRIPTION OF THE PREFERRED EMBODIMENTS

Figure 1:
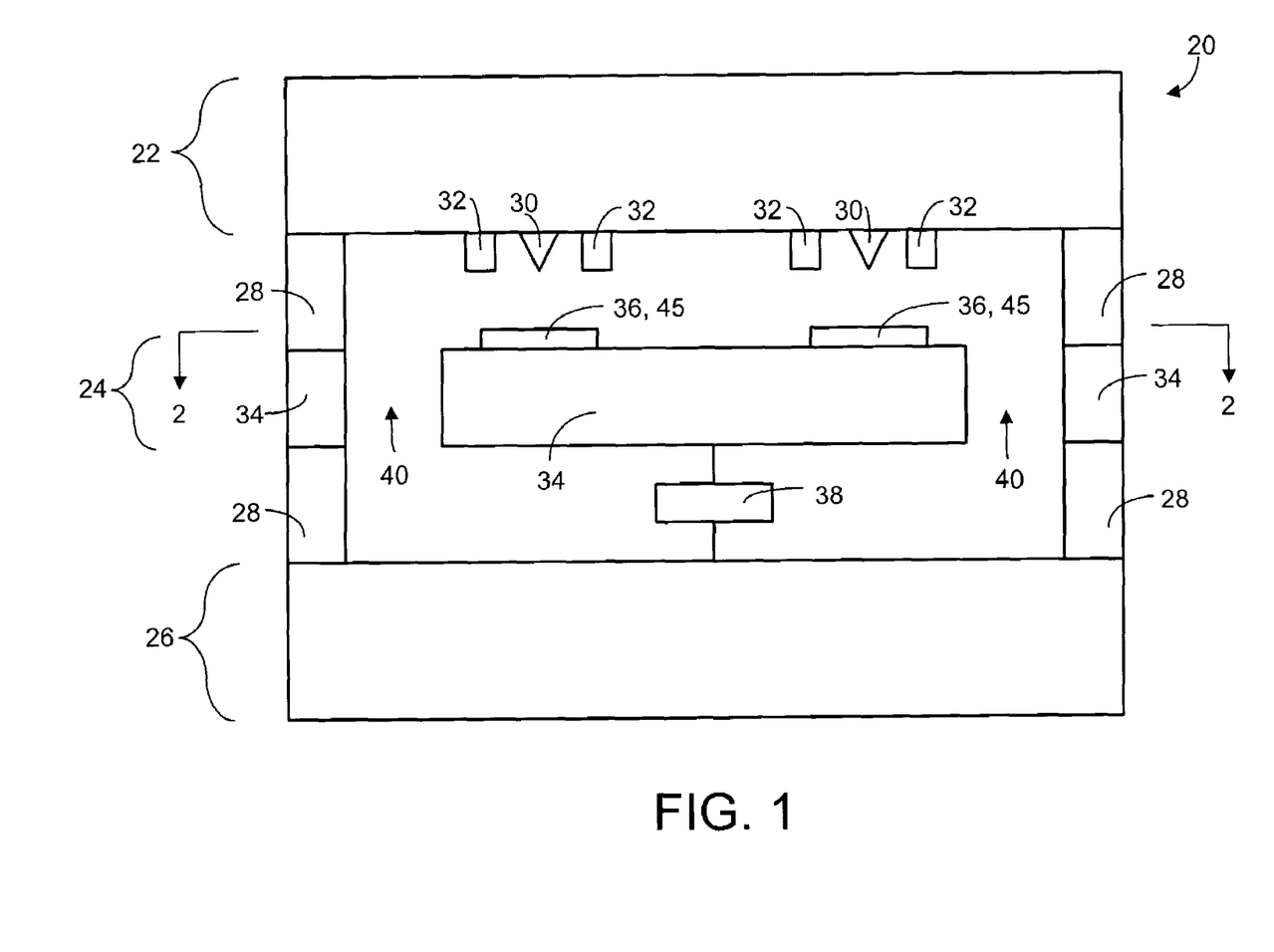
FIG. 1 schematically illustrates an embodiment of a storage device in a side cross-sectional view.

FIG. 1 schematically illustrates an embodiment of a storage device 20 in a side cross-sectional view. The storage device 20 has three layers which are bonded together, including an emitter layer 22, a rotor layer 24, and a stator layer 26. Bonding surfaces 28 may be constructed as part of either of the layers 22, 24, 26 prior to bonding, or may be separate elements. The bonding surfaces 28 may also be conductive or contain conductive traces in order to allow electrical coupling between the layers 22, 24, 26. The emitter layer 22 has one or more field emitters 30, and a gate 32 for each field emitter 30. The field emitters 30 have a sharp point with a radius of curvature sized such that when a preselected potential difference is applied between a field emitter 30 and its corresponding gate 32, an electron beam current is released from the point of the field emitter 30 towards the rotor layer 24. Although the field emitters 30 are illustrated as having a point, field emitters with other shapes may be desirable, such as flat field emitters, depending on a given application.

The rotor layer 24 has a substrate 34, typically made of a crystalline structure, such as silicon which has been doped to be highly conductive. Patches of phase change media 36 are coupled to the substrate 34. The stator layer 26 and the rotor layer 24 interact with each other through an actuation mechanism, here schematically illustrated as actuator 38. Although actuator 38 is schematically illustrated as physically coupled between the stator layer 26 and the rotor layer 24, no physical connection is necessary. While piezoelectric actuators, and the like, may be physically coupled between the stator layer 26 and the rotor layer 24, non-contact methods for actuation may be used. For example, electrodes may be formed on the stator layer 26 and on the rotor layer 24, facing each other, and may be aligned such that varying voltages to certain electrodes serve to move the rotor layer 24 as the electrodes position themselves within the resultant electric fields. FIG. 1 illustrates the actuator 38 schematically for ease of understanding, but it should be understood that all contact and non-contact methods of moving the rotor layer 24 may be compatible with storage devices.

Figure 2:
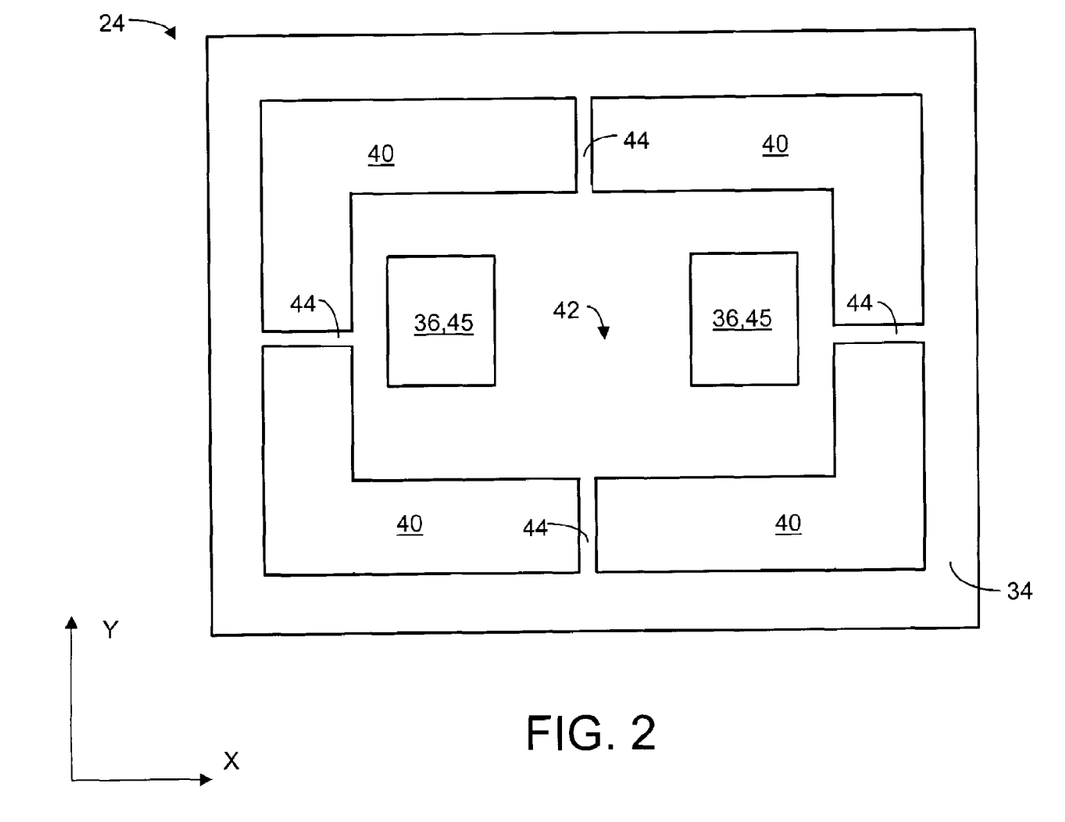
FIG. 2 is a cross-sectional top view of the embodied storage device of FIG. 1.

The rotor layer 24 defines a series of gaps 40 which allow a portion of the rotor layer 24 to be moved by the actuator 38. The gaps 40 may be better seen in FIG. 2. FIG. 2 is a cross-sectional top view of the embodied storage device 20 of FIG. 1, taken along section line 2—2, and showing the rotor layer 24. The moveable portion of the rotor layer 24 is often referred to as a micromover 42. The micromover 42 is defined by the gaps 40 and beams 44. Beams 44 are manufactured thin enough to allow them to flex, thereby allowing movement of the micromover 42 back and forth along the X-axis and the Y-axis, or combinations thereof, when actuated by the actuator 38. The micromover 42 has patches of phase change media 36 in different locations.

Referring once again to FIG. 1, each field emitter 30 is positioned over a corresponding patch of phase change media 36. In other embodiments, one field emitter 30 may be allocated for several patches of phase change media 36. Each patch of phase change media 36 may also be referred to as a data cluster 45. When the field emitter 30 is positioned in a particular location over a data cluster 45, the emitter 30 is said to be over a storage location. When an electron beam current is released from the field emitter 30 towards the rotor layer 24, it will contact a storage location in a data cluster 45. The storage density of each data cluster 45 may be determined by the number of unique storage locations which the micromover 42 may be moved to. The number of unique storage locations are determined in great part by the spot size of the electron beam. For more information on methods of moving a micromover 42, writing with field emitters 30, focusing electron beams to improve storage density, as well as different types of phase change media 36, reference can be had to U.S. Pat. No. 5,557,596, the specification of which is herein formally incorporated by reference.

Figure 3:
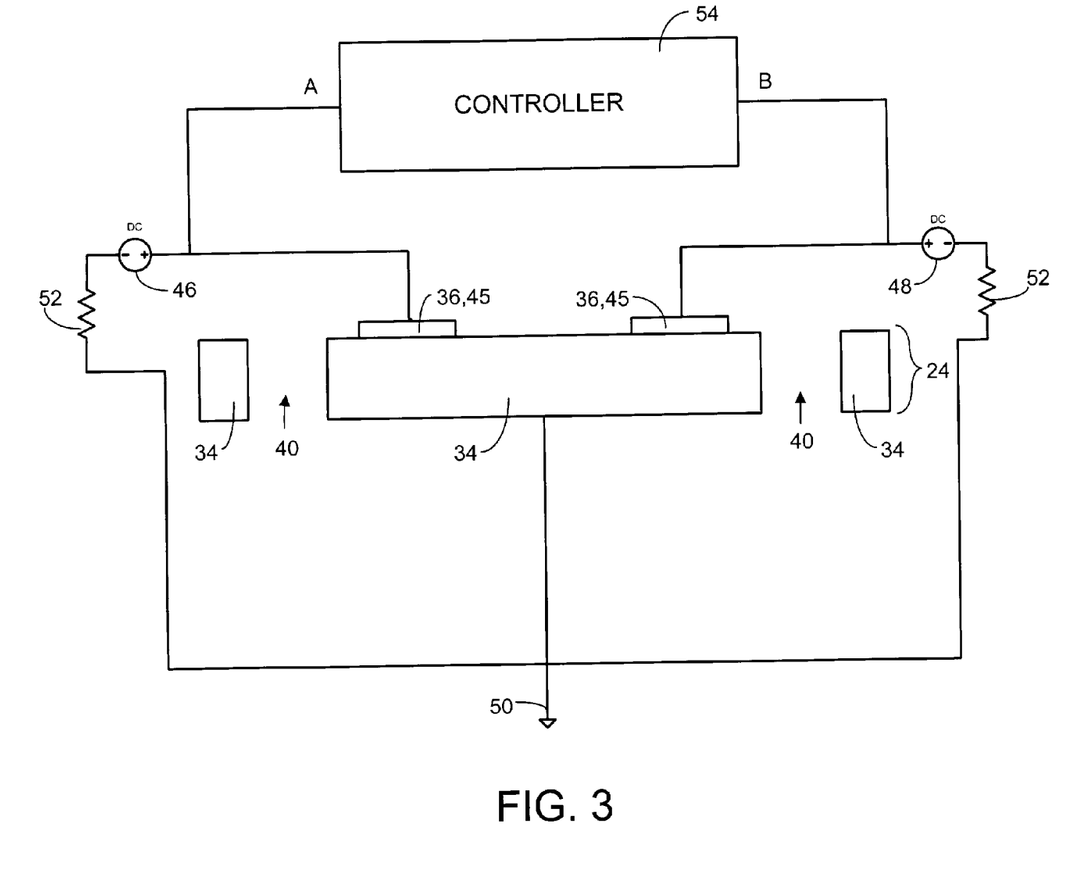
FIG. 3 schematically illustrates one embodiment of data reading circuitry for the storage device of FIG. 1.

FIG. 3 schematically illustrates one embodiment of data-reading circuitry for the storage device of FIG. 1. In FIG. 3, the only layer of the storage device 20 which is shown is the rotor layer 24. This is done for ease of explanation, however, it should be understood that the storage device 20 has three layers 22, 24, 26 which are bonded together as discussed with respect to FIG. 1. FIG. 3 shows the positive end of bias voltage 46 coupled to a first data cluster 45. The negative end of bias voltage 46 is coupled to a common ground 50 through a first current limiting resistor 52. The positive end of bias voltage 48 is coupled to a second data cluster 45. The negative end of bias voltage 48 is coupled to the common ground 50 through a second current limiting resistor 52. A controller 54 may be provided to monitor the states of the data clusters 45 during data reading periods. One of the data clusters 45 is coupled to controller 54 at input A. The other data cluster 45 is coupled to the controller 54 at input B. Electron beam currents may be emitted from field emitters 30 and aimed at data clusters 45. Electron beam currents below a threshold (determined by the phase change media 36) will not change the physical properties of the media 36. In this case, excitation from the electron beam at a storage location will cause current to flow from the data cluster 45, through the substrate 34. When there is no electron beam excitation, there is no current flowing through the data clusters 45 and the substrate 34, so the inputs A and B will see the voltage provided by the bias voltages 46 and 48, respectively. When there is electron beam excitation on a given data cluster 45, the voltage sensed at inputs A and B will depend on the physical state of the phase change media 36 to which they are coupled. For example, if the phase change media coupled to input A is in a first physical state at a particular data location, then electron beam excitation at that data location might cause the controller 54 to see a lower voltage at input A (compared to the bias voltage 46) during excitation because current flows easily through the phase change media 36 and the substrate 34 to ground 50. On the other hand, if the phase change media coupled to input A is in a second physical state (less conductive than the first state) at a particular data location, then the same electron beam excitation at that data location might cause the controller 54 to see a higher voltage at input A (compared to the voltage when the media is in the first physical state). The controller 54 can then associate the varying voltages read at inputs A and B with binary or multi-level data values for data locations within their respective data clusters 45. Functionally and structurally equivalent circuitry may be substituted for the circuitry schematically illustrated in FIG. 3, and this specification is intended to include all such equivalents which should be apparent to those skilled in the art. Controller 54 may be a suitably programmed microprocessor, an Application Specific Integrated Circuit (ASIC), discreet analog components, digital components, or any combination or equivalent thereof. Signals read by the controller 54 are common mode signals.

Figure 4A:
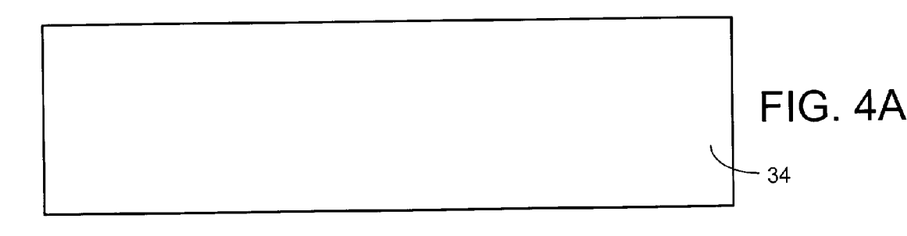
FIGS. 4A–4F schematically illustrate, in side cross-sectional views, one embodiment of a method to isolate data clusters for a storage device.
Figure 4B:
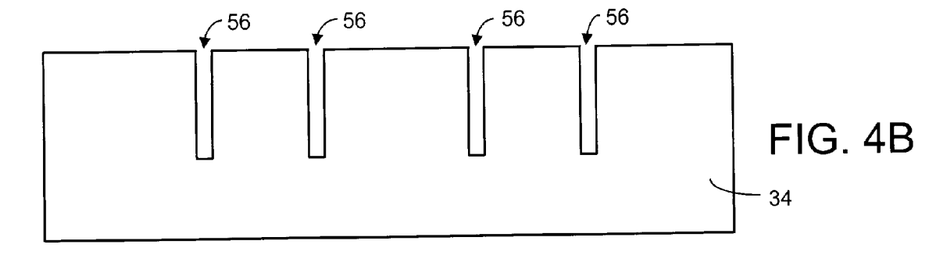
Figure 4C:
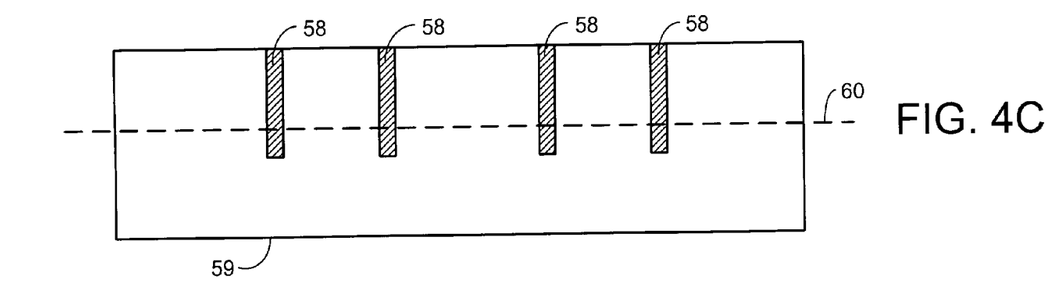
Figure 4D:
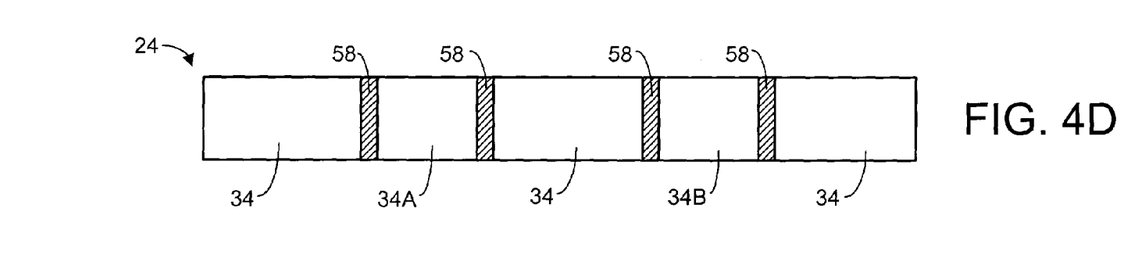
Figure 4E:
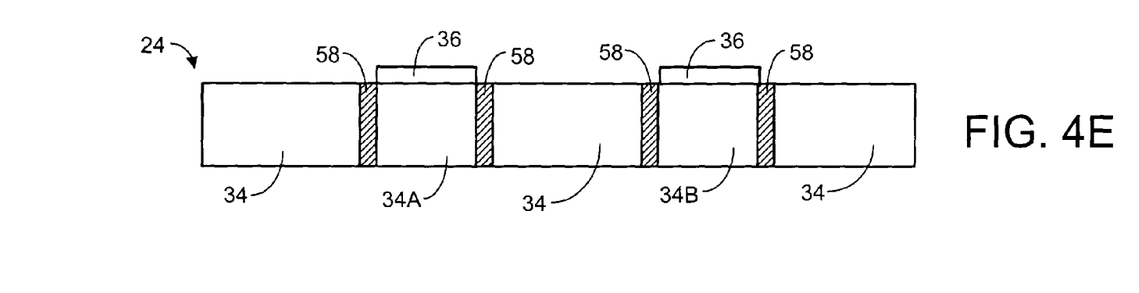

FIGS. 4A–4F schematically illustrate, in side cross-sectional views, one embodiment of a method to isolate data clusters for a storage device. FIG. 4A shows a starting slab of material which is intended to form the substrate 34 in the rotor layer 24. Substrate 34 is typically chosen to be crystalline silicon which has been doped to be highly conductive. In an etching step, deep trenches 56 are etched into the substrate 34 as shown in FIG. 4B. The trenches 56 are etched such that they will be positioned around the locations where the data clusters 45 will be formed. The trenches 56 are then filled with an insulating dielectric material 58 as shown in FIG. 4C. In the embodiment of FIG. 4C, the single dielectric material 58 completely fills the trenches 56. Suitable dielectric materials may be nitrides and oxides, such as aluminum-oxide, silicon-dioxide, and silicon-nitride, as well as high resistivity polycrystalline silicon. The substrate 34 is then thinned from the backside 59 up to a level illustrated as dashed line 60. Backside thinning may be accomplished by a variety of chemical or mechanical abrasion processes. After backside thinning, the rotor layer 24 has taken on the form illustrated in FIG. 4D, where the dielectric material 58 can electrically isolate areas of the substrate 34, such as substrate areas 34A and 34B. The dielectric material 58 is also mechanically supporting the substrate areas 34A, 34B, and may even be selected to provide tensile and compression characteristics of the rotor layer 24 which will either make the micromover 42 more or less flexible, as desired. In another step, illustrated in FIG. 4E, the phase change media 36 is deposited in the substrate areas 34A and 34B, between the dielectric material 58. Although the phase change media 36 is shown as being deposited or layered on top of the substrate areas 34A, 34B, the phase change media 36 may also be impregnated or diffused into the surface of the substrate areas 34A and 34B. In another step, illustrated in FIG. 4F, the substrate 34 is etched to define gaps 40, leaving beams 44 to support the micromover 42 of the rotor layer 24. FIG. 5 is a top view of the rotor layer 24 schematically illustrated in FIG. 4F. In FIG. 5, the gaps 40 and the beams 44 can be more clearly appreciated. The dielectric material 58 which surrounds and isolates the data clusters 45 is also shown. By using the process of FIGS. 4A–4F, isolation is established without needing to rely on relatively high temperature processes to remove portions of the substrate 34 after bonding of the emitter, rotor, and stator layers 22, 24, 26. The formation of the rotor layer 24 in FIGS. 4A–4F is not likely to introduce additional steps in the fabrication process flow, since deep trench etching and oxide backfill may already be used in formation of the through-wafer connections (not shown). Formation of the connections on the storage device and masking steps, such as lithographic techniques, which are employed in the fabrication of semiconductor devices are not discussed, as such techniques are varied, compatible with this disclosure, and known to those skilled in the art.

Figure 5:
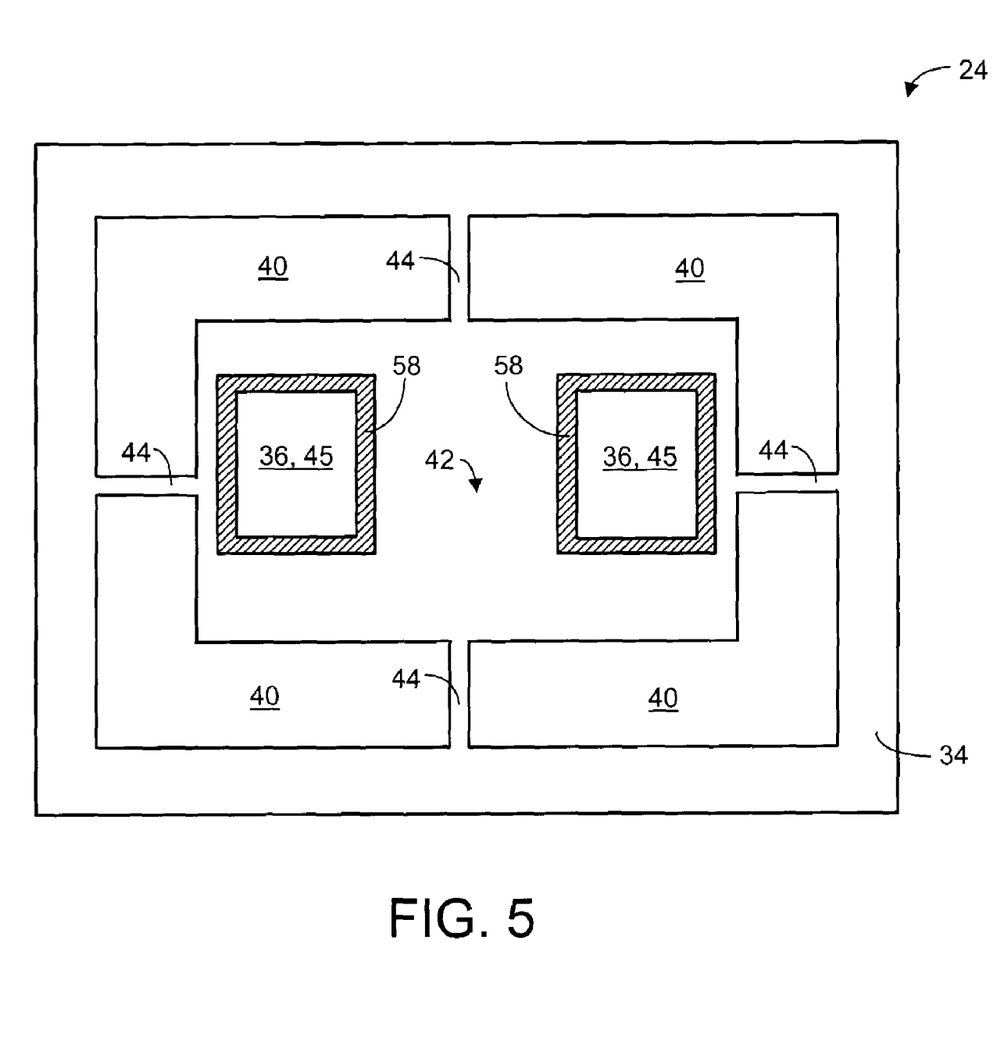
FIG. 5 is a top view of the isolated data clusters schematically illustrated in FIG. 4F.
Figure 6:
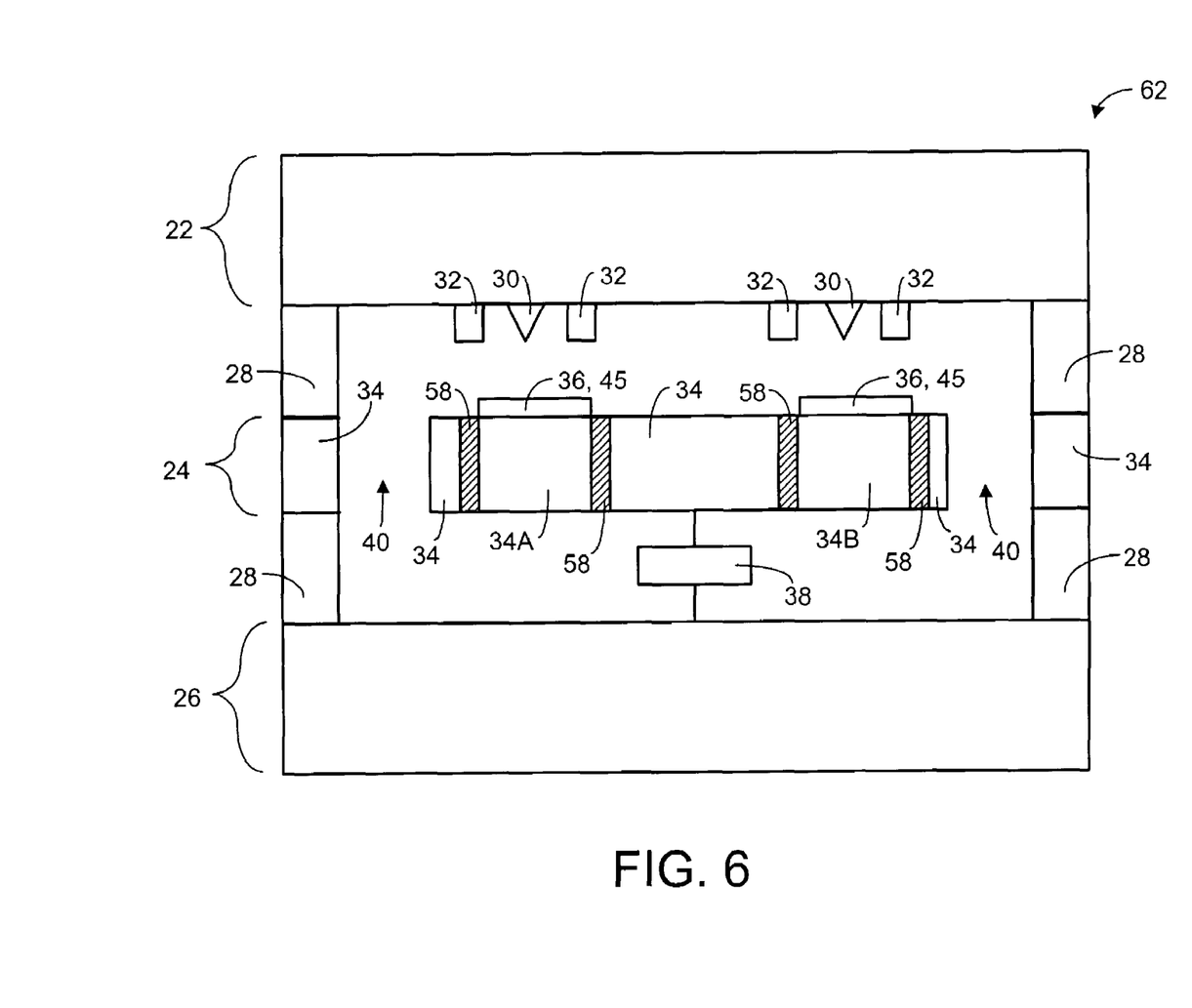
FIG. 6 schematically illustrates an embodiment of a storage device, utilizing the isolated data clusters of FIG. 4F, in a side cross-sectional view.

FIG. 6 schematically illustrates an embodiment of a storage device 62 in a side cross-sectional view. The storage device 62 has three layers which are bonded together, including an emitter layer 22, a rotor layer 24, and a stator layer 26. The rotor layer 24 illustrated in FIG. 6 is the rotor layer 24 previously discussed in FIGS. 4F and 5. Bonding surfaces 28 may be constructed as part of either of the layers 22, 24, 26 prior to bonding, or may be separate elements. The bonding surfaces 28 may also be conductive or contain conductive traces in order to allow electrical coupling between the layers 22, 24, 26. The emitter layer has one or more field emitters 30, and a gate 32 for each field emitter 30.

The stator layer 26 and the rotor layer 24 interact with each other through an actuation mechanism, here schematically illustrated as actuator 38. Although actuator 38 is schematically illustrated as physically coupled between the stator layer 26 and the rotor layer 24, no physical connection is necessary. While piezoelectric actuators, and the like, may be physically coupled between the stator layer 26 and the rotor layer 24, both non-contact and contact methods of activating or moving the micromover 42 of the rotor layer 24 may be used, as previously discussed.

Figure 7:
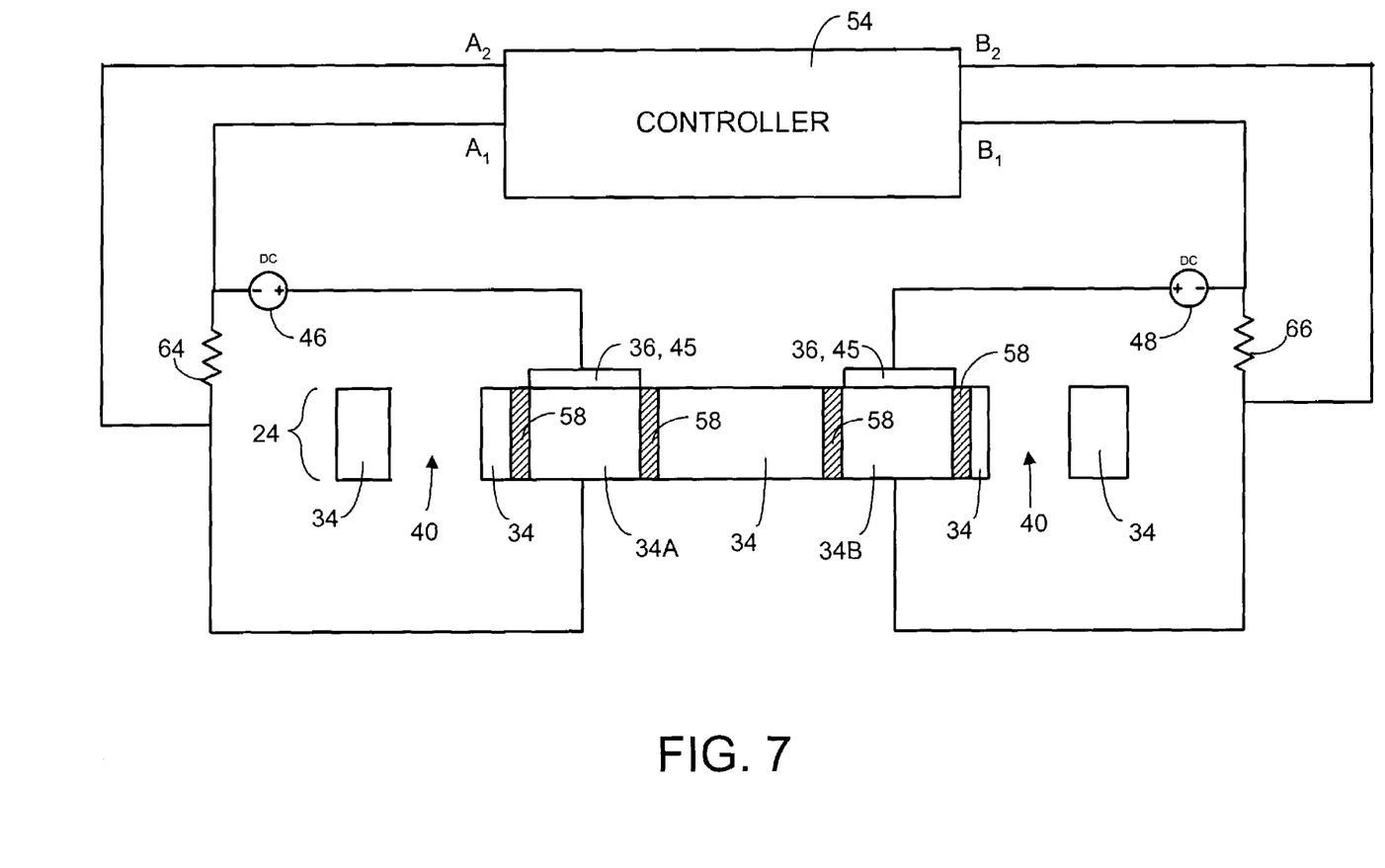
FIG. 7 schematically illustrates one embodiment of data reading circuitry for the storage device of FIG. 6.

FIG. 7 schematically illustrates one embodiment of data-reading circuitry for the storage device of FIG. 6. In FIG. 7, only the rotor layer 24 of the storage device 62 is shown. This is done for ease of explanation, however, it should be understood that the storage device 62 has three layers 22, 24, 26 which are bonded together as discussed with respect to FIG. 6. FIG. 7 shows the positive end of bias voltage 46 coupled to the data cluster 45 associated with substrate 34A. The positive end of bias voltage 48 is coupled to the data cluster 45 associated with substrate 34B. The negative end of bias voltage 46 is coupled to a first side of resistor 64. The negative end of bias voltage 48 is coupled to a first side of resistor 66. The substrate 34A is coupled to a second side of resistor 64, and the substrate 34B is coupled to a second side of resistor 66. A controller 54 is provided to monitor the states of the data clusters 45 during data reading periods. The first side of resistor 64 is coupled to controller 54 at input $A_1$. The second side of resistor 64 is coupled to controller 54 at input $A_2$. The difference in voltage potential across resistor 64 will be sensed by the controller 54, and this difference may be correlated to the data state of storage locations within the data cluster 45 associated with substrate 34A. The first side of resistor 66 is coupled to controller 54 at input $B_1$. The second side of resistor 66 is coupled to controller 54 at input $B_2$. The difference in voltage potential across resistor 66 will be sensed by the controller 54, and this difference may be correlated to the data state of storage locations within the data cluster 45 associated with substrate 34B.

Electron beam currents may be emitted from field emitters 30 and aimed at data clusters 45. Electron beam currents below a threshold (determined by the phase change media 36) will not change the physical properties of the media 36. In this case, excitation from the electron beam at a storage location will cause current to flow from the data clusters 45, through the substrate 34A or the substrate 34B, depending on which data cluster or clusters are being used. In the case of the data cluster 45 associated with substrate 34A, when there is no electron beam excitation, there is no current flowing through the data cluster 45 and the substrate 34A, therefore there is no current flowing through the resistor 64. Thus, the inputs $A_1$ and $A_2$ will see no potential difference across resistor 64. When there is electron beam excitation on the data cluster 45 associated with substrate 34A, current will flow through the substrate 34A in relation to the physical state of the phase change media 36 at the given storage location. The potential difference sensed between inputs $A_1$ and $A_2$ will vary in relation to the current which is caused by the electron beam excitation. For example, if the phase change media is in a first physical state at a particular data location, then electron beam excitation at that data location might cause the controller 54 to see a first potential difference between inputs $A_1$ and $A_2$ during excitation because of the characteristics of the phase change media 36 while in the first physical state. On the other hand, if the phase change media 36 is in a second physical state (more conductive than the first state) at a particular data location, then the same electron beam excitation at that data location might cause the controller 54 to see a higher potential difference between inputs $A_1$ and $A_2$ (compared to the potential difference when the media is in the first physical state). The controller 54 can then associate the varying potential differences between inputs $A_1$ and $A_2$ with binary or multi-level data values for data locations within the data cluster 45. The data cluster 45 associated with substrate 34B and inputs $B_1$ and $B_2$ would operate in a similar fashion. This embodiment utilizes electrically isolated media patches 36, enabling differential signal detection, thereby resulting in much lower electrical noise. Functionally and structurally equivalent circuitry may be substituted for the circuitry schematically illustrated in FIG. 7, while preserving the differential signaling capabilities, and this specification is intended to include all such equivalents which should be apparent to those skilled in the art. Controller 54 may be a suitably programmed microprocessor, an Application Specific Integrated Circuit (ASIC), discreet analog components, digital components, or any combination or equivalent thereof. Signals read by the controller 54 in FIG. 7 are differential mode signals.

Figure 8:
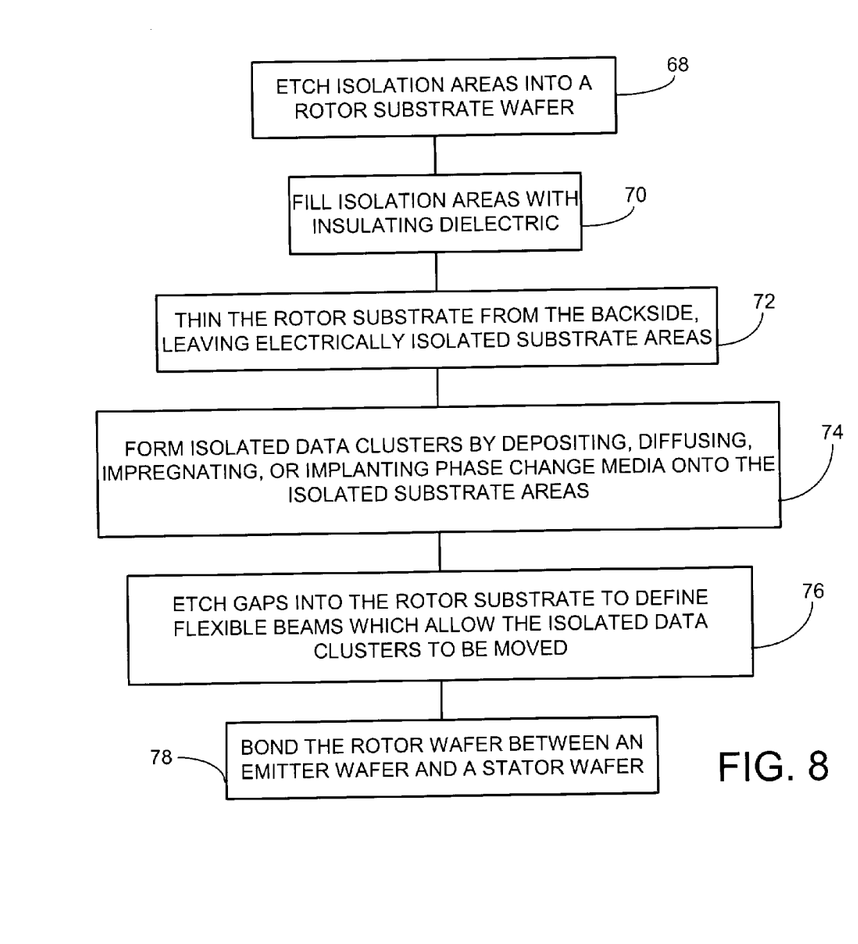
FIG. 8 is a flowchart illustrating one embodiment of actions which may be used to isolate data clusters for a storage device.

FIG. 8 is a flowchart illustrating one embodiment of actions which may be used to isolate data clusters for a storage device 62. Isolation areas are etched 68 into a rotor substrate wafer. The isolation areas are filled 70 with an insulating dielectric. The rotor substrate is thinned 72 from the backside, leaving electrically isolated substrate areas. Isolated data clusters are formed 74 by depositing, diffusing, impregnating, or implanting a phase change media onto the electrically isolated substrate areas. Gaps are etched 76 into the rotor substrate to define flexible beams which allow the isolated data clusters to be moved. The rotor wafer (or rotor layer) is bonded 78 between an emitter wafer (or emitter layer) and a stator wafer (or stator layer).

Figure 4F:
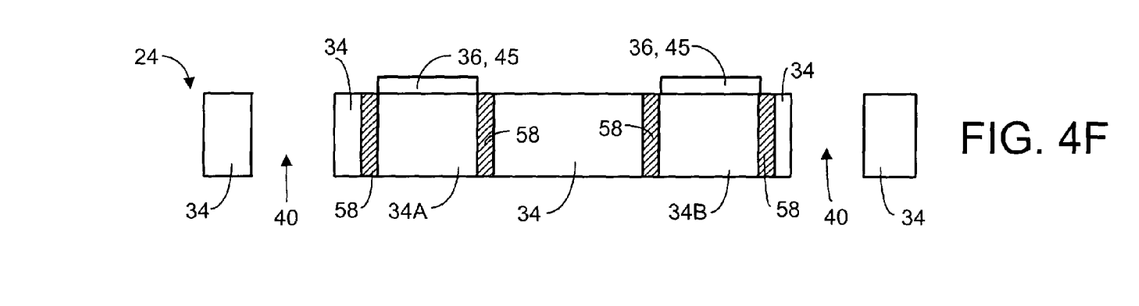
Figure 9:
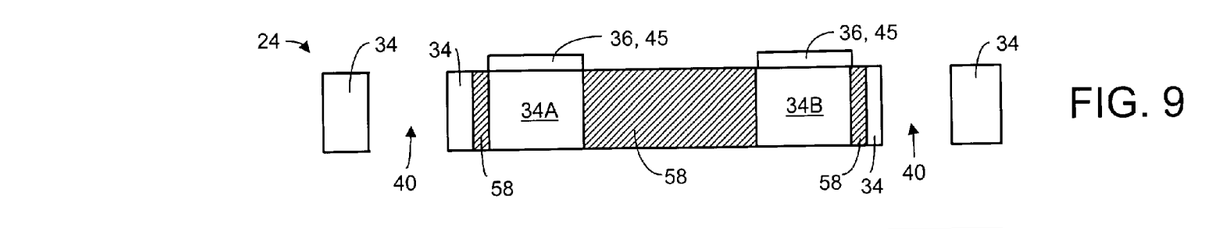
FIG. 9 schematically illustrates one embodiment of isolated data clusters for a storage device in a side cross-sectional view.
Figure 10:
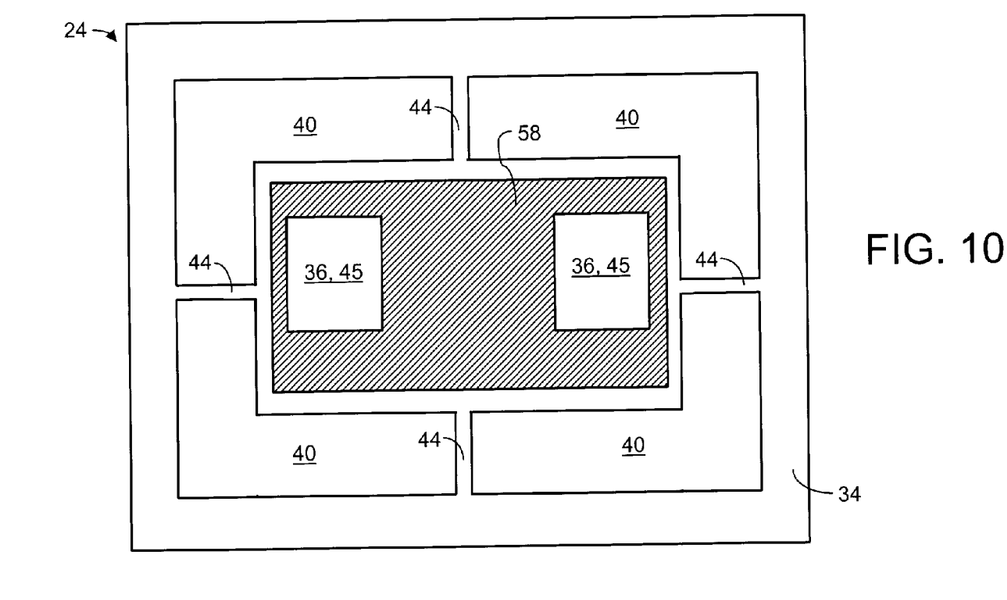
FIG. 10 is a top view of the isolated data clusters schematically illustrated in FIG. 9.

The actions of FIG. 8 could be used to produce the rotor layer previously described with respect to FIGS. 4F and 5. Other types of rotor layers may also be manufactured with the actions of FIG. 8, such as the rotor layer 24 schematically illustrated in FIGS. 9 and 10. FIG. 9 schematically illustrates one embodiment of isolated data clusters for a storage device in a cross-sectional side view. FIG. 10 is a top view of the isolated data clusters schematically illustrated in FIG. 9. In the embodiment of FIGS. 9 and 10, the dielectric material 58 has been placed throughout the micromover 42, not just around data clusters 45. This may be desirable if additional electrical isolation is required between data clusters 45, or if the mechanical properties of the dielectric 58 make the rotor layer 24 lighter or heavier, or more or less flexible than if it contained more of the substrate material 34. By adding different amounts of dielectric material 58 or by changing the physical layout of the dielectric material 58, the dampening of the micromover 42 may be adjusted as desired. The isolation areas may be etched and filled with insulating dielectric to adjust the modulus of the micromover through the ratio and layout of the insulating dielectric with respect to the substrate.

Although the embodied storage devices 20, 62 were illustrated as having one electron field emitter 30 for each data cluster 45, it should be understood that a single field emitter 30 can be used to access more than one data cluster, depending on a particular storage device design, and these types of storage devices and their equivalents are deemed to be within the scope of the claims below. Micromover isolation techniques were discussed with respect to storage devices, however, the disclosed isolation techniques may also be applicable to other micromover devices where isolation is required on highly conductive substrates. Additionally, it is apparent that a variety of other structurally and functionally equivalent modifications and substitutions may be made to implement data cluster isolation or isolation on a micromover device according to the concepts covered herein, depending upon the particular implementation, while still falling within the scope of the claims below.

We claim:

1. A storage device, comprising
    a stator layer;
    an emitter layer; and
    a rotor layer, wherein the rotor layer comprises a plurality of data clusters, each having a substrate which is electrically isolated from the other data clusters by a dielectric material.

2. The storage device of claim 1, wherein the rotor layer is bonded between the emitter layer and the stator layer.

3. The storage device of claim 2, wherein the stator layer and the rotor layer are coupled together by an actuator.

4. The storage device of claim 3, wherein the actuator further comprises a piezoelectric device to move a micromover portion of the rotor layer.

5. The storage device of claim 3, wherein the actuator further comprises a non-contact means for moving a micromover portion of the rotor layer.

6. The storage device of claim 1, wherein the data clusters comprise a phase change media.

7. The storage device of claim 6, wherein the emitter layer comprises at least one electron field emitter and at least one electron field gate, wherein:
    the rotor layer may be moved to align one or more of the data clusters beneath the electron field emitter; and
    an electron beam current may be generated from the electron field emitter when an appropriate voltage potential is applied between the electron field emitter and the electron field gate wherein the electron beam current may cause a current to flow in the phase change media.

8. The storage device of claim 1, further comprising:
    first conductive bonding surfaces which couple the emitter layer to the rotor layer; and
    second conductive bonding surfaces which couple the rotor layer to the stator layer.

9. The storage device of claim 1, wherein the emitter layer comprises at least one pointed field emitter.

10. The storage device of claim 1, wherein the emitter layer comprises at least one flat emitter.

11. A storage device, comprising:
    means of electrically isolating a data cluster of phase change media coupled to a conductive substrate;
    a voltage source having first and second ends, wherein the resistor first end is coupled to the phase change media;
    a resistor having first and second ends, wherein the resistor first end is coupled to the second source end, and the resistor second end is coupled to the conductive substrate; and
    a controller having first and second inputs wherein:
        the first input is coupled to the resistor first end;
        the second input is coupled to the resistor second end; and
        the potential difference between the first and second inputs is used to determine a data state of a data location within the data cluster when the data location is bombarded by an electron beam current.

12. A method of electrically isolating conductive regions on a micromover device, comprising:
    etching isolation areas into a rotor substrate wafer;
    filling the isolation areas with an insulating dielectric;
    thinning the rotor substrate wafer from the backside, leaving electrically isolated substrate areas;
    etching gaps into the rotor substrate wafer to define flexible beams which allow the isolated substrate areas to be moved; and
    bonding the rotor wafer between a second wafer and a stator wafer.

13. The method of claim 12, wherein the micromover device is a storage device and the second wafer is an emitter wafer, the method further comprising:
    after thinning the rotor substrate, depositing, diffusing, impregnating, or implanting a phase change media onto the isolated substrate areas.

14. The method of claim 12, wherein the isolation areas are etched and filled with insulating dielectric to extend throughout the micromover device, beyond what would be necessary for electrical isolation alone.

15. The method of claim 14, wherein the isolation areas are etched and filled with insulating dielectric to adjust the modulus of the micromover through the ratio and layout of the insulating dielectric with respect to the substrate.

* * * * *

UNITED STATES PATENT AND TRADEMARK OFFICE
CERTIFICATE OF CORRECTION

| | | |
|---|---|---|
| PATENT NO. | : 6,961,299 B2 | Page 1 of 1 |
| APPLICATION NO. | : 10/310606 | |
| DATED | : November 1, 2005 | |
| INVENTOR(S) | : Bicknell-Tassius et al. | |

It is certified that error appears in the above-identified patent and that said Letters Patent is hereby corrected as shown below:

Col. 8 (line 7), delete "resistor first" and insert therefor --first source--.

Signed and Sealed this

Twelfth Day of December, 2006

JON W. DUDAS
*Director of the United States Patent and Trademark Office*